United States Patent [19]
Gossett

[11] Patent Number: 6,081,882
[45] Date of Patent: Jun. 27, 2000

[54] QUANTUM ACCELERATION OF CONVENTIONAL NON-QUANTUM COMPUTERS

[75] Inventor: Carroll Philip Gossett, Mountain View, Calif.

[73] Assignee: Silicon Graphics, Inc., Mountain View, Calif.

[21] Appl. No.: 09/057,701

[22] Filed: Apr. 9, 1998

[51] Int. Cl.[7] .................................................. G06F 17/10
[52] U.S. Cl. .................................................. 712/1; 712/32
[58] Field of Search .................................... 712/1, 32, 34

[56] References Cited

U.S. PATENT DOCUMENTS

| | | | |
|---|---|---|---|
| 5,086,483 | 2/1992 | Capps | 382/31 |
| 5,768,297 | 6/1998 | Shor | 371/40.11 |
| 5,838,436 | 11/1998 | Hotaling | 365/345 |
| 5,917,322 | 6/1999 | Gershenfeld | 324/307 |

FOREIGN PATENT DOCUMENTS

| 0697737 A1 | 2/1996 | European Pat. Off. | ........ H01L 29/15 |
|---|---|---|---|

OTHER PUBLICATIONS

*The Machine* by Issac Chuang, Internet Article at http://feynman–stanford,edu/qcomp/chuang–qcomp/qcomp/node4–html pp 1–3, Aug. 31, 1995.

*A Short Introduction to Quantum Computation* by Barenco A. Ekert Internet Article at http://www.qubit.org/intros/comp/comp.html pp 1–8, Nov. 1996.

*Quantum Computation* by David Deutch et al, Physics World Mar. 1998 pp.1–11.

*Model Quantum Computer and Quantum Code*: by Samuel L. Braunstein pp. 118–127, Aug. 23, 1998.

Learning DNF Over the Uniform Distribution Using a Quantum Example Oracle by N. H. Bshouty et al. Proceedigs of 8th Annual Conf. on Comp. Learning Theory pp. 118–127, 1995.

Chuang et al., "Bulk Quantum Computation with Nuclear Magnetic Resonance: Theory and Experiment" Quantum Coherence and Decoherence, ITP Conference, Santa Barbara, CA USA, Dec. 15–18, 1996, vol. 454, No. 1969, pp. 447–467.

Bandyopadhyay S. et al., "Computational Paradigms In Nanoelectronics: Quantum Coupled Single Electron Logic and Neuromorphic Networks", Japanese Journal of Applied Physics, vol. 35, No. 6A, Jun. 1, 1996, pp. 3350–3362.

Brassard G: "New Trends In Quantum Computing" Stacs, 96, 13th Annual Symposium on Theoretical Aspects of Computer Science, Proceedings, 22–24. Feb. 1996 pp. 3–10.

Porod W: "Quantum–dot Devices and Quantum–dot Cellular Automata", Visions of Nonlinear Science in the 21st Century, Jun. 26, 1996, vol. 334B, No. 5–6, pp. 1147–1175.

*Primary Examiner*—Eric Coleman
*Attorney, Agent, or Firm*—Wagner Murabito & Hao LLP

[57] ABSTRACT

A process and apparatus for quantum acceleration of a conventional computer by coupling a few quantum devices to the conventional computer. Initially, a first, second, and third maximally entangled qubit are prepared in a Greenberger-Horne-Zeilinger state. A fourth qubit is prepared in a perfect superposition of states which is unentangled from the three qubits. The second qubit is then measured and its measured value is input to the conventional computer. The conventional computer operates on this measured input value and performs an inverse oracle function. The second qubit is modified according to the output from the conventional computer. This modified qubit is used as one of two control inputs for controlling a quantum gate. The other control input is the fourth qubit. The quantum gate phase inverts the third qubit according to the two control inputs. A measurement of the complement of the first qubit is taken in order to produce the necessary quantum interference of the third qubit. The third qubit can now be measured to find the correct final solution. An N-bit quantum accelerated computer can be constructed by implementing N numbers of 4-qubit sets.

26 Claims, 6 Drawing Sheets

QUANTUM ACCELERATION OF CONVENTIONAL NON-QUANTUM COMPUTERS

FIELD OF THE INVENTION

The present invention relates to a method and apparatus for greatly accelerating the processing power of a conventional, non-quantum computer by applying a relatively few quantum devices.

BACKGROUND OF THE INVENTION

Conventional computers are comprised of millions of transistors which operate as "switches" that can be either turned "on" or turned "off." When a transistor is turned on or conducting, it is said to represent one state (i.e., "1"); and when the transistor is turned off or non-conducting, it represents another state (i.e., "0"). Thereby, the state of a transistor can be used to represent a bit of data (i.e., 0 or 1). Individual transistors are interconnected to form gates for performing digital logic functions. A computer program instructs the logic to perform a given algorithm on a set of given inputs. By controlling the switching of these transistors millions of times per second, a computer can perform the steps of a programmed algorithm very rapidly. For example, a computer can easily be programmed to multiply two numbers together and attain the result almost instantaneously (e.g., 127×229=29083). Nevertheless, there are some problems which are very difficult to compute. This is due to the fact that the algorithms for solving these problems are very complicated and call for repeated iterations. For example, factorization is very difficult (e.g., given 29083 find A and B where A×B=29083). Recently, it took the combined processing power of approximately 1600 conventional workstations around the world eight months to factor a 129 digit number. Extrapolating, it would take approximately 800,000 years to factor a 250 digit number. While no efficient method is known for factoring large numbers, there exists no proof that efficient factorization is impossible. However, there exist problems known as "NP-complete" (e.g., 3SAT) that take an exponential amount of time to solve on a classical Turing machine. Simply increasing the speed or number of processors in conventional computers would minimally impact our ability to solve these NP-complete problems. Clearly, a radical new approach is needed if solutions posed by these sets of problems are to be efficiently solvable.

One possible solution envisioned in the future pertains to harnessing and applying the principles of quantum mechanics to performing computations. Such a "quantum" computer would theoretically be capable of solving NP-complete problems orders of magnitude faster than a conventional computer. Instead of using traditional bits, a quantum computer would operate on quantum mechanical bits (qubits). Unlike a traditional bit which is always a 0 or always a 1, the qubit can be in a state comprised of a combination or "superposition" of both 0 and 1. The superposition of the multiple states of a qubit is defined by a wave function. Due to the unique properties of wave functions and quantum mechanics, each of the superposition of states of qubits are capable of being processed simultaneously. Whereas a conventional N-bit computer performs N computations, an N-qubit quantum computer can perform $2^N$ computations at the same time due to the quantum parallelism phenomenon. In other words, the processing power of a quantum computer increases exponentially as compared to linearly for a conventional computer. Thereby, problems which took exponential time to solve by a conventional computer would be capable of being efficiently solved in polynomial time by a quantum computer.

Unfortunately, the technology for building an actual physical, working quantum computer made up entirely of quantum circuits may be decades away. Some well respected scientists and physicists have questioned whether it is even possible to construct a useful quantum computer. See C. H. Bennett, D. P. DiVincenzo, "Progress Towards Quantum Computation," S. L. Braunstein, "Quantum Computation: A Tutorial," J. Preskill, "Quantum Computing: Pro and Con," Svozil, "First International Conference on Unconventional Models of Computation UMC '98, An Unconventional Review," and V. Vedral, M. B. Plenio, "Basics of Quantum Computation." The reason why it is so difficult to build a quantum computer is because the qubits, in their quantum superposition of states, exist in an extremely delicate and sensitive phase coherent balance. Any outside disturbance at all (e.g., simply observing the qubit), will cause the wave function collapse or "decohere" to a specific one of its several possible simultaneous states, in which case, all of the other states, along with the information represented therein, will be lost. Thus, the qubits must be isolated in order to preserve their quantum phase coherency. And yet, the qubits must somehow be loaded into the quantum computer with initial input conditions, controlled to perform specified functions, and then read out to find the final answer. It is these two seemingly contradictory constraints, which makes it extremely difficult to construct a quantum computer.

The present invention provides a novel, unique solution to this dilemma by accelerating a conventional computer with the addition of a few, small quantum devices ingeniously coupled to the conventional computer. The advantage of the present invention is that the conventional computer is readily available and is relatively inexpensive to program and maintain, but its processing power is exponentially increased by virtue of the quantum devices interacting with the conventional computer. Thereby, the bulk of this new hybrid quantum computer is comprised of a conventional computer with ordinary semiconductor circuits which do not need to kept in an isolated, phase coherent state. Yet, it has the full advantage of parallel, exponential quantum processing conferred by the few quantum devices. Furthermore, the present invention greatly minimizes the number of coupled qubits necessary for useful applications.

SUMMARY OF THE INVENTION

The present invention pertains to a process and apparatus for the quantum acceleration of a conventional computer with the addition of a few quantum devices. Initially, one or more quantum devices are used to prepare a first qubit, a second qubit, and a third qubit which are maximally entangled in a Greenberger-Horne-Zeilinger state. A fourth qubit is prepared in a perfect superposition of states which is unentangled from the other three qubits. The second qubit is measured and its measured value is input to the conventional computer. The conventional computer operates on this measured input value and performs an inverse oracle function. The second qubit is then modified according to the output from the conventional computer. This modified qubit is used as one of two control inputs for controlling a quantum gate. The other control input is the fourth qubit. The gate selectively inverts the phase of the third qubit according to the two control inputs. The final solution is found by measuring the third qubit. However, before the third qubit is measured, a measurement of the complement of the first qubit must be taken so that the necessary quantum interference of the third qubit can occur. The quantum interference causes all the incorrect solutions to cancel out while reinforcing the correct answer(s) to a probability of 1 (100%). The third qubit can then be measured to find the correct final solution. An N-bit quantum accelerated computer can be constructed by scaling N numbers of 4-qubit sets in this manner. Thereby, this hybrid quantum computer enables computations to be performed orders of magnitude faster because the processing occurs in the quantum mechanical domain. Yet, the bulk of this hybrid quantum computer system is constructed from standard semiconductor circuits which follow classical physics.

BRIEF DESCRIPTION OF THE DRAWINGS

The operation of this invention can be best visualized by reference to the drawings.

DETAILED DESCRIPTION

An apparatus and method for the quantum acceleration of a conventional computer is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention. But first, a detailed description relating to the application of a pure quantum computer for solving NP-complete or hard problems is presented. And later, a detailed description of how this quantum computer can be constructed by adapting a conventional computer to act in combination with a relatively few number of quantum devices, is taught and disclosed.

Quantum algorithms typically have the following form: start with some number of known (e.g., pure state) qubits. Some or all of these qubits are then Hadamard transformed into a superposition of states. One or more unitary transformations are then applied. Some or all of the resulting qubits are again Hadamard transformed to cause different possible computational paths to interfere. The resulting qubits are measured to find the answer.

Implicitly, all the qubits are measured on read-out. However, measuring all the qubits limits the benefit of quantum algorithms to no more than a quadratic factor over that of conventional algorithms. This quadratic limitation exists because, while there can be exponentially many superpositions of quantum states, the probability of success is only quadratically improved over a classical probabilistic Turing machine. However, it has been discovered that this limitation can be overcome if one were to forego performing a complete measurement at the end. In other words, previously proposed quantum computation systems have implicitly assumed that the measurement of the output state (readout) is made across all qubits of the system. This is, however, not a requirement of quantum mechanics. It is perfectly fine from a quantum physical standpoint to measure some quantum variables, while leaving others unobserved. It is precisely the summation over histories for these unmeasured quantum variables that allows perfect cancellation of wrong results and reinforcement of the correct result. This partial measurement introduces an effective nonlinearity, without resorting to any modification to the theory of quantum mechanics itself. It does this by taking full advantage of the nonlinearity inherent in the process of measurement of a quantum system.

A quantum algorithm, in which not every qubit is measured, is now described. If one or more qubits remain unmeasured, it becomes possible to make a perfect one-hit oracle. In this oracle, a given superposition of states destructively interfere for all the wrong answers and constructively interfere for the one right answer. This produces the correct result with a probability of 1 (100%)—assuming ideal quantum devices. Given a perfect one-hit oracle, one can solve the hard or NP-complete problems efficiently.

It should be noted that it is not necessary for any ancillary qubits to be restored to their original states, since the quantum algorithm described above, is not iterative. Any ancillary qubits can be regarded as superfluous "discard," used only to maintain reversibility as required by the unitarity of quantum operators. It is not even required that they be left in a pure state, so long as they are not measured, at least until after the desired qubits have already been measured. It is not even strictly necessary, though there is no reason to doubt that it is possible, for a useful quantum computer to itself be able to emulate a Turing machine. There already exist classical computation universal machines. Appending a quantum computer onto a classical Turing machine does not make the Turing machine any less computation universal.

Figure 1:
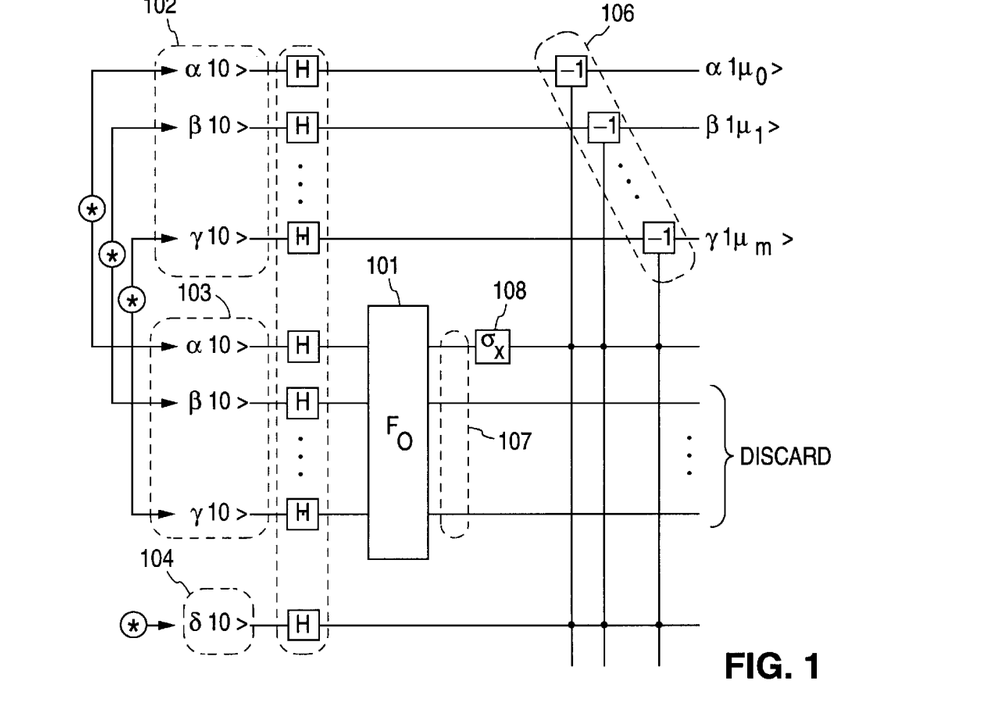
FIG. 1 shows a quantum computer for solving hard or NP-complete problems.

Referring to FIG. 1, a quantum computer for solving hard or NP-complete problems is shown. To implement a perfect N qubit one-hit oracle, a network 101 of quantum gates (e.g., Fredkin-Toffoli gates) to implement an "inverse oracle function" is first constructed. This function answers "false" when the single correct N qubit input is supplied and "true" when any incorrect input is supplied. The N-1 qubits which do not form the inverse oracle function output (required for reversibility) are ignored. A superposition of all possible oracle input states 102, together with a maximally entangled copy 103, is prepared in advance. Note that this preparation does not violate the "no-cloning" theorem, since the entangled pairs of mixed states can be created entangled. An additional unentangled set of N qubits 104, uncorrelated with either copy of the oracle inputs, in a superposition of all possible states is also prepared in advance. Each of these input qubits are Hadamard transformed 105. In one embodiment, a Pauli negation matrix 108 is coupled to the output of the oracle 101.

For each of the N gates in succession, one per oracle input qubit, the corresponding inverse oracle function output 107 is provided as one of the two control inputs of a corresponding one of the double controlled phase-inversion gate 106. The corresponding unentangled qubit 104, in a perfect superposition of "true" and "false," is provided to the other control input. The maximally entangled copy 102 of the corresponding oracle input qubits is provided to the third, conditionally inverted input to the double-controlled phase-inversion gates 106. (See A. Barenco, C. H. Bennett, R. Cleve, D. P. DiVincezo, N. Margolus, P. Shor, T. Sleator, J. Smolin, H. Weinfurter, *Elementary Gates For Quantum Computation,* Quant-ph/9503016, which is incorporated by reference in its entirety herein as background material). When the two control inputs are both "true," the phase of the third input is inverted. The unitary matrix corresponding to this gate is shown as follows:

$$\begin{pmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & -1 & 0 \\ 0 & 0 & 0 & 0 & 0 & 0 & 0 & -1 \end{pmatrix}$$

Note that while the phase produced by the double-controlled phase-inversion gate will be "forced back" into the oracle output qubit, a simple phase inversion does not change the logical (i.e., "true"/"false") value of the oracle output qubit, and hence, does not disrupt its value for subsequent gates. Similarly, any phase forced back into the unentangled qubits is irrelevant, since these qubits will neither be used again nor measured. Furthermore, for each oracle input qubit in the correct state, the corresponding double-controlled phase-inversion gate will not invert the phase, regardless of the state of the corresponding unentangled qubit. For each incorrect state, the phase will be inverted when the corresponding unentangled qubit is "true," and not when it is "false." If one chooses to not measure these unentangled qubits, one must sum over all possible values of these unentangled qubits.

A simple example of a one bit oracle is now presented to provide a more thorough explanation of this aspect of the present invention. The input of the double-controlled phase-inversion gate can be represented in "ket" notation as |fui>, where |f> is the inverse oracle function output qubit, |u> is the unentangled and unmeasured qubit, and |i> is one of the oracle input qubits. In this example, there are two possibilities:

1) If the inverse oracle function is "false" (|0>) when the input qubit is "false" (|0>), then |f>=|i>, and the superposition of input states is:

(½)*(|000>+|010>+|101>+|111>).

Applying the unitary operator for the double-controlled phase-inversion gate to this superposition produces an output of:

(½)*(|000>+|010>+|101>−|111>).

If one neglects to measure the |u>qubit, the one must sum over all possible values of |u>, producing:

(½)*(2*|0?0>+0*|1?1>).

Thus, the output qubit is |i>=|0> with a probability of 1 (100%).

2) If the inverse oracle function is "false" (|0>) when the input qubit is "true" (|1>), then |f>=not |i>, and the superposition of input states is:

(½)*(|001>+|011>+|100>+|110>).

Applying the unitary operator for the double-controlled phase-inversion gate to this superposition produces an output of:

(½)*(|001>+|011>+|100>−|110>).

If one neglects to measure the |u> qubit, the one must sum over all possible values of |u>, producing:

(½)*(2*|0?1>+0*|1?0>).

Thus, the output qubit is |i>=|1> with a probability of 1 (100%).

In either case, the incorrect result cancels out perfectly, and the correct result reinforces perfectly, thereby producing the correct result with probability 1. Note that in addition to not measuring the |u> qubit, the |f> qubit is also not measured. This does not, however, cause any additional summation over histories, since in this case, the |f> input qubit is initially effectively entangled and correlated with the |i> qubit.

For N qubit cases with multi-bit oracles, since there are multiple quantum gates, one should analyze the system as a whole. The input of the multi-bit oracle can be represented in "ket" notation as |e1; e2; u> (reordered compared to the one qubit example given above), where |e1> and |e2> are the two sets of N pair-wise entangled qubits, and the single instance of |u> is the set of N unentangled qubits. The semicolons represent concatenation. The |e1> qubits are used for the inverse oracle function and are not measured. Although, one of them is used as the output of the inverse oracle function. The |e2> qubits are conditionally phase inverted and are ultimately measured. The superposition of these partially pair-wise entangled input states is:

$$\left(\frac{1}{2}\right)^N * \sum_{e=0}^{N-1} \sum_{u=0}^{N-1} |e; e; u\rangle$$

Assuming that the N bit correct answer for the one-hit oracle is |c>, then the 2^(3*N) by 2^(3*N) unitary matrix representing the overall system (where i and j each span the concatenated qubits |e1; e2; u> and parity |u> is the N-way xor of the qubits of |u>) is:

$$U(i, j) = 1 \quad (i = j, |e1\rangle = |c\rangle, \text{ for } 2^N \text{ values of } |u\rangle)$$
$$\qquad\qquad 1 \quad (i = j, |e1\rangle \ne |c\rangle, \text{ parity}(|u\rangle) = |0\rangle)$$
$$\qquad\qquad -1 \quad (i = j, |e1\rangle \ne |c\rangle, \text{ parity}(|u\rangle) = |1\rangle)$$
$$\qquad\qquad 0 \quad (i \ne j),$$

Applying the operator, U, to the above superposition of partially pair-wise entangled |e1; e2; u> states, and again neglecting to measure the |u> qubits, summing over all possible values of |u>, the resulting output qubits are |e2>=|c> with probability 1.

Again, the incorrect results all cancel out perfectly, and the one correct result reinforces perfectly. Thereby, this produces the correct result with probability 1. As with the one bit example, note that in addition to not measuring the |u> qubits, this embodiment intentionally does not measure the |e1> qubits. Likewise, this does not cause any additional summation over histories, since the |e1> qubits start out entangled with the |e2> qubits.

Paralleling the construction of the one-hit oracle described above, one can construct an oracle, which is not necessarily one-hit, with one more bit than the total number of inputs to the Boolean equation to be tested for satisfiability. If this extra qubit is |0>, the logical negation of the Boolean equation to be tested is produced as the inverse oracle function output. If the extra qubit is |1>, then |0> is output if all the other oracle input qubits are also |1>. However, |1> is output if some or all of the other oracle input qubits are |0>. Note that since the Boolean equation to be tested in a hard or NP- complete (e.g., 3SAT) problem can only be polynomial in size, this network can only be polynomial in size, and therefore in depth. Hence, it only takes polynomial time to evaluate, assuming constant delay per gate.

If the Boolean equation under test is not satisfiable, the inverse oracle function will only be |0> when all the oracle inputs (including the extra one) are |1>. If this were the case, the network of quantum gates described above will always produce all output qubits as |1>. If, however, there is one set of input values that satisfies the Boolean equation under test, then half of the time the extra qubit will be |1> when measured, and half the time it will be |0>. If there are more than one set of input values that satisfy the Boolean equation under test, then the extra qubit will be |0> with a correspondingly larger probability.

By repeating the computation M times, if the extra qubit is always |1>, then the Boolean equation under test is not satisfiable with probability $1-2^{(-M)}$. If the extra qubit is ever |0>, the Boolean equation under test is satisfiable with probability 1. Note that while this is a probabilistic algorithm, the probability can be made arbitrarily close to unity (at the cost of a modest constant factor of M). The probability of error can be made smaller than the error rate of whatever physical devices this quantum computer is constructed from. Hence, for all practical purposes, this probabilistic algorithm is as good as deterministic. Moreover, this solution of hard problems completes with arbitrarily bounded probability in polynomial space and time.

A detailed description of how a conventional computer can be accelerated by coupling it to a few quantum devices is now presented. It has been discovered that by considering quantum decoherence as an observer-dependent phenomenon, the bulk of a quantum computer can be implemented in the classical, conventional domain with standard silicon semiconductor circuits. This greatly reduces the number of coupled qubits necessary for useful quantum computation applications while retaining the full power of quantum computation. A system of N sets of 4-qubit quantum circuits is capable of accelerating NP-complete problems by a factor of $2^N$.

Figure 2:
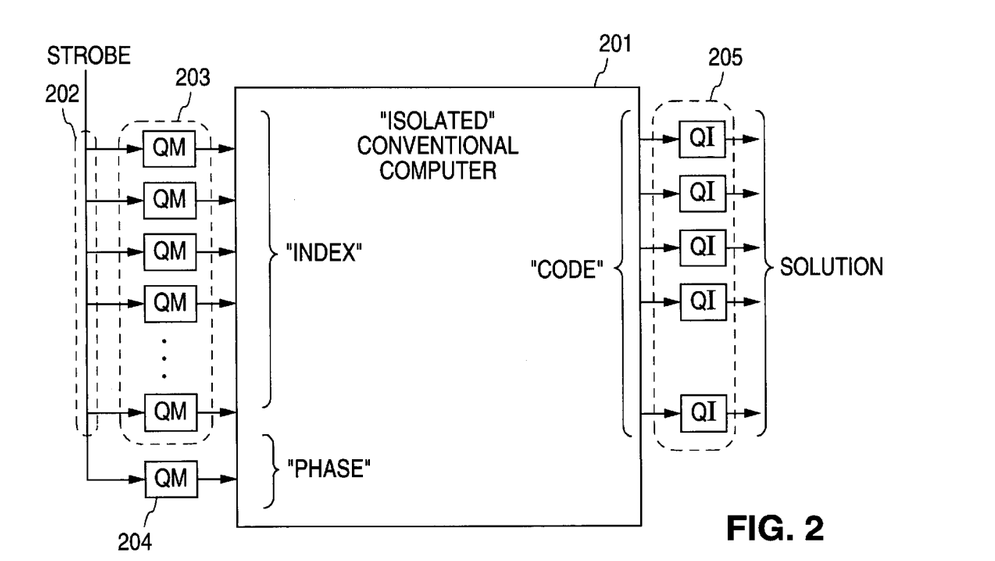
FIG. 2 shows a conventional computer with quantum acceleration.

Such a conventional computer with quantum acceleration is shown in FIG. 2. A conventional computer 201 is isolated from the rest of the world. The conventional computer 201 is used to perform the function described above for implementing a perfect N-bit one-hit inverse oracle. This inverse oracle function answers "false" when the single correct N qubit inputs 202 are supplied and "true" when any incorrect qubit inputs 202 are supplied. But since the inverse oracle function is in the classical domain, a measurement of the quantum input states needs to be taken before they can legitimately be input to the conventional computer 201. These measurements are accomplished by a set of quantum measuring devices 203. Furthermore, as described above, a qubit 204 is used to provide phase coherence. The problem is coded in the conventional computer 201 as an exhaustive search, whereby the wrong answers cancel, and the correct answer reinforces. A set of quantum interference devices 205 are coupled to the output of conventional computer 201. The solution is then given by the outputs of the quantum interference devices 205.

Figure 3:
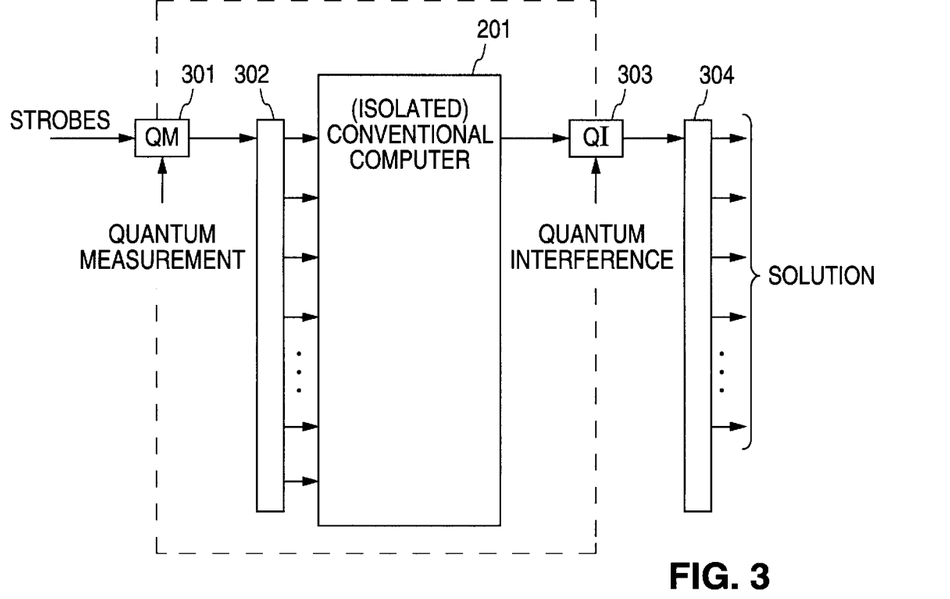
FIG. 3 shows an improvement over the quantum accelerated computer system.

FIG. 3 shows an improvement over the quantum accelerated computer system of FIG. 2. Instead of having multiple quantum measuring devices, a single quantum measuring device 301 is used to measure the qubit inputs, and a shift register 302 is used to forward the measured inputs to the conventional computer 201. Likewise, a single quantum interference device 303 is coupled to the output of conventional computer 201 and feeds into a shift register 304. The solution is read out from the outputs of shift register 304. Note that the inside of the box represented by the dashed line, must be kept isolated from the rest of the universe in order to prevent the collapse of the wave function.

Figure 4:
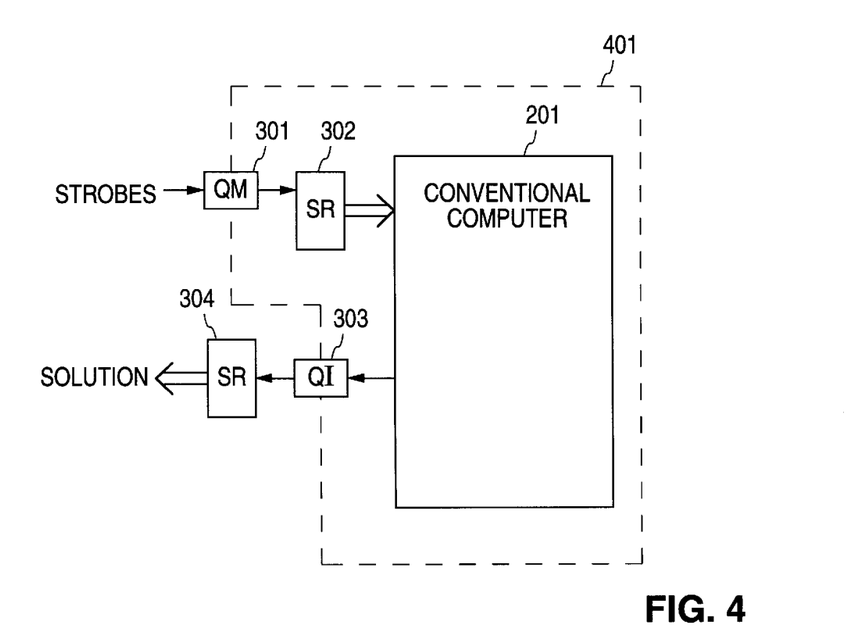
FIG. 4 shows a quantum computer which has been redrawn to show that the whole computer must be kept isolated within a "box."

FIG. 4 shows the quantum computer of FIG. 3, which has been redrawn to show that the whole computer must be kept isolated within a "box" 401. The qubit input strobes are input to quantum measuring device 301 which feeds into a shift register 302. A bus connects the outputs from shift register 302 to the inputs of conventional computer 201. A bus connects the output of conventional computer 201 to a quantum interference device 303 which feeds into shift register 304. The solution is given by the outputs of sift register 304. Box 401 encompasses quantum measuring device 301, shift register 302, conventional computer 201, and quantum interference device 303.

Figure 5:
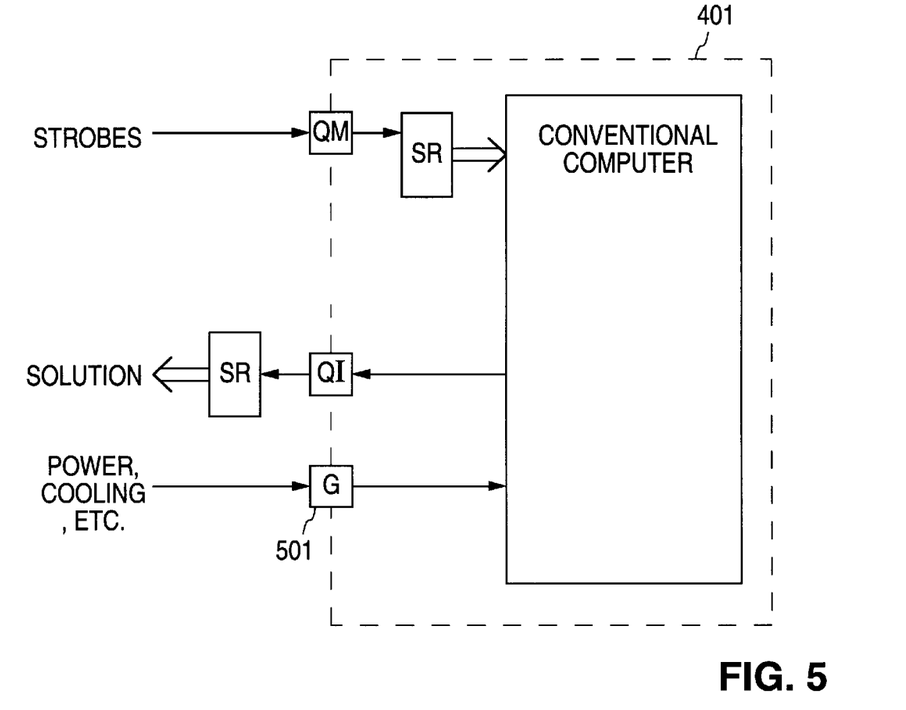
FIG. 5 shows the quantum computer with added complexities.

FIG. 5 shows the quantum computer with added complexities. Practically, there needs to be some mechanism for inputting power, cooling, etc. into the isolated box 401. However, these requirements violate the isolation requirement. Hence, there needs to be some mechanism for handling power, cooling, etc. into box 401, yet retaining the isolation. One mechanism is to include an isolation gate 501 which serves as an interface between box 401 and the outside universe.

Figure 6:
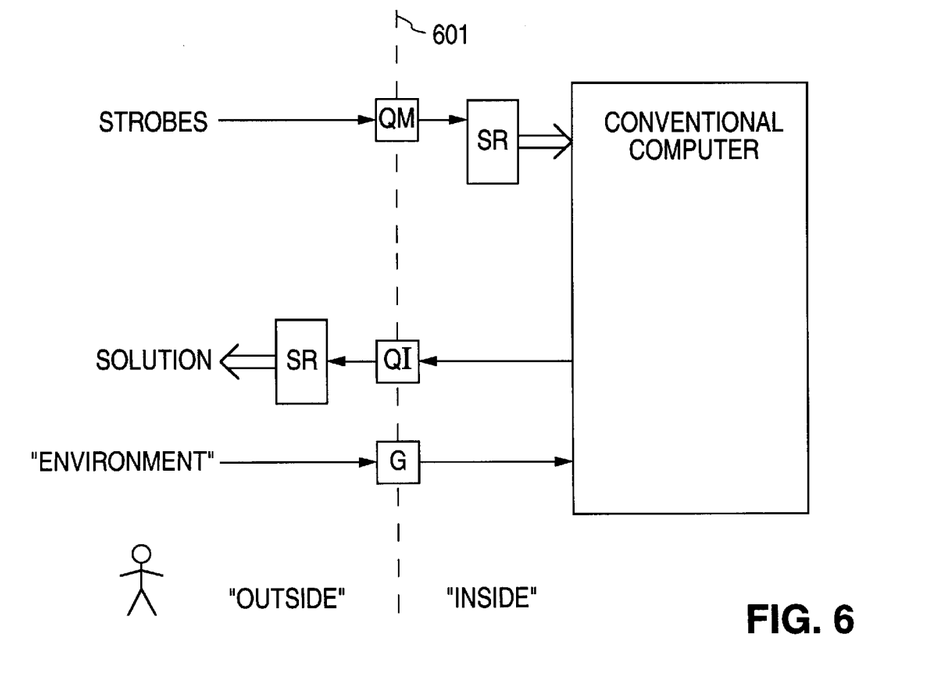
FIG. 6 shows the quantum computer, whereby the isolation problem is viewed as being half the universe.

FIG. 6 shows the quantum computer, whereby the isolation problem is viewed as being half the universe. It can be seen that the box of FIG. 5 has been enlarged to include half of the universe. In other words, everything to the right of dashed line 601 is considered to be "inside," whereas everything to the left of dashed line 601 is considered-to be "outside."

Figure 7:
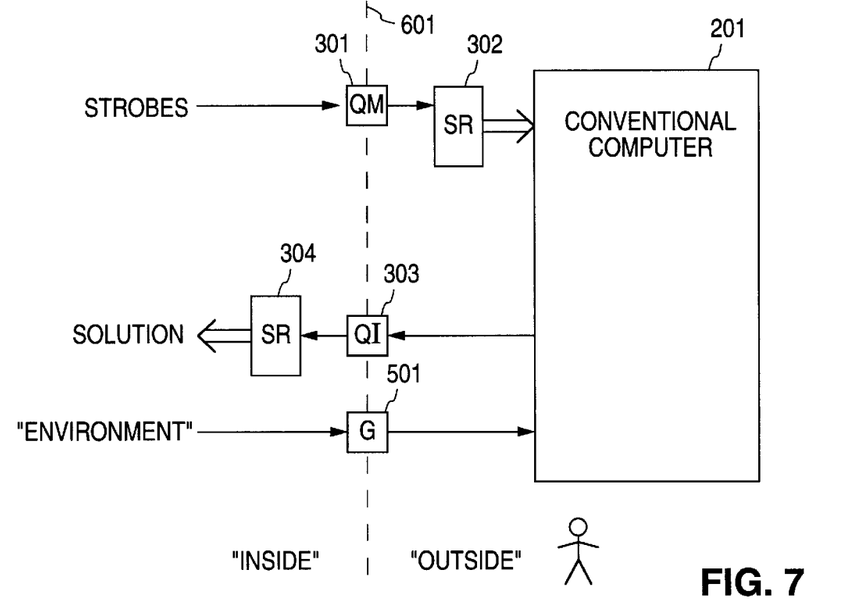
FIG. 7 shows a quantum computer system from a different reference.

FIG. 7 shows the same quantum computer system as FIG. 6, except that the references have changed. Now, everything to the right of dashed line 601 is considered to be "outside," and everything to the left of dashed line 601 is considered to be "inside." In this arrangement, shift register 302 and conventional computer 201 fall outside and thus, do not have to be isolated. Hence, they can be constructed of standard semiconductor circuitry. The quantum measuring device 301, quantum interference device 303, shift register 304, and quantum gate 501 fall inside. As such, they have to be kept isolated. However, note that circuitry associated with the quantum measuring device 301, quantum interference device 303, shift register 304, and quantum gate 501 are relatively small. The bulk of the circuits can be fabricated using standard semiconductor techniques.

Figure 8:
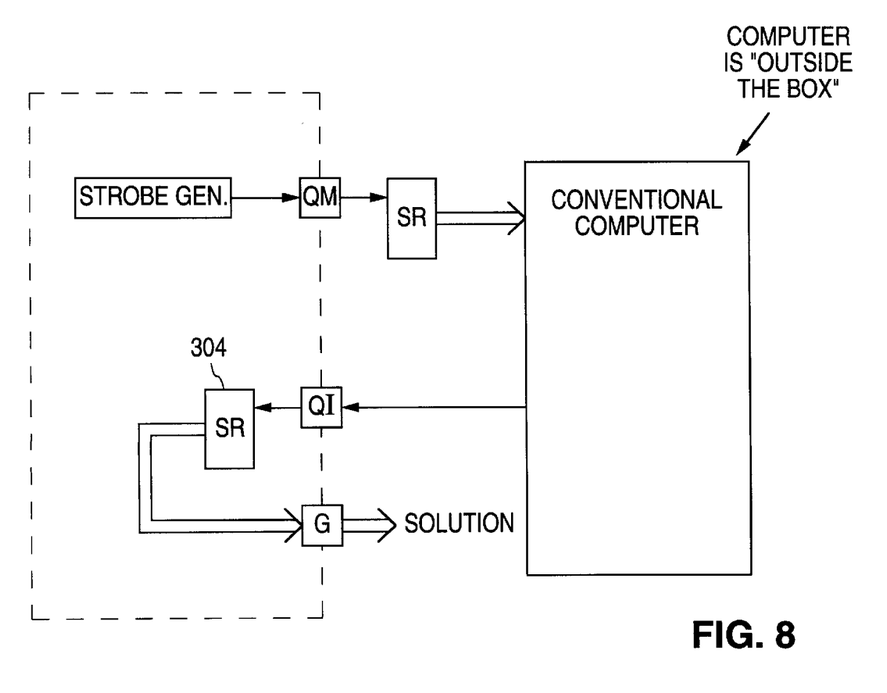
FIG. 8 shows a quantum computer with the isolation box closed from a different point of view.

FIG. 8 shows a quantum computer with the isolation box closed from a different reference. It can be seen that the output is reconnected so that the box is closed the other way. Now, all that is "inside the box" is a shift register 304. Shift register 304 can be implemented through any one of several different quantum techniques (e.g., quantum dot based).

Figure 9:
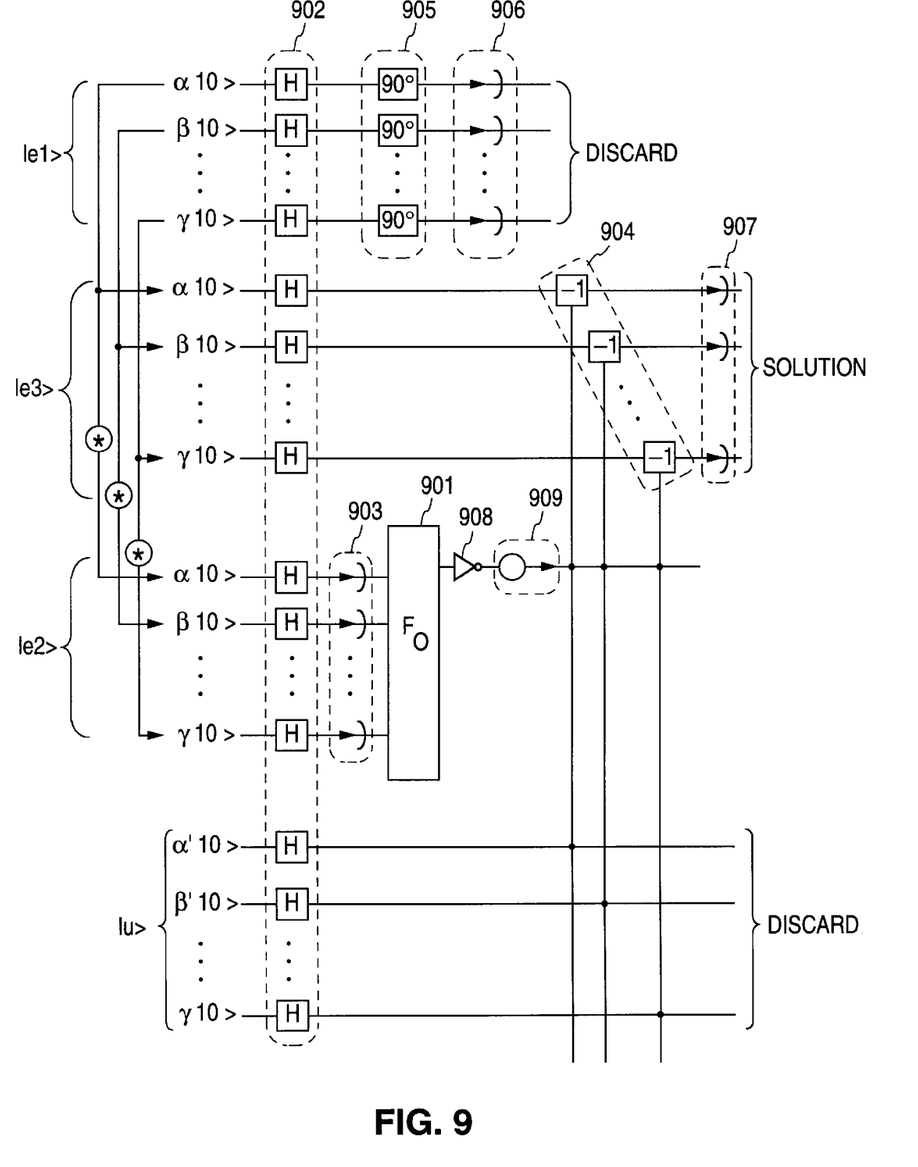
FIG. 9 is a more detailed diagram showing the currently preferred embodiment of the quantum accelerated computer system of the present invention.

FIG. 9 is a more detailed diagram showing the currently preferred embodiment of the quantum accelerated computer system of the present invention. Since the inverse oracle function is implemented in the classical domain by conventional computer 901, there is a need to make a measurement of the input qubit states for the conventional computer 901 to operate on. This measurement is taken by devices 903. The inverse oracle function output is then used to modify one or more of the qubits to be used for the quantum part of the computation. The quantum state is represented by 909.

But first, N sets of 4 qubits are prepared in advance with three of the four qubits in a Greenberger-Horne-Zeilinger (GHZ) state:

$$2^{(-1/2)}*(|000>+|111>).$$

The fourth qubit is placed in a perfect superposition of $|0>$ and $|1>$ as follows:

$$2^{(-1/2)}*(|0>+|1>).$$

The fourth qubit is also unentangled with the three GHZ qubits. The other sets are similarly prepared, but are not entangled between sets. In one embodiment, a Hadamard transformation 902 is performed to place the qubits in a superposition of states. In other embodiments, alternative methods are used to achieve the superposition of states.

In each of the N sets, a first one of the three GHZ qubits is measured. This measurement is performed by the quantum measuring devices 903. From the "outside" universe's point of view, any further measurement of the other two entangled qubits (or any unitary function thereof) will be collapsed when measured to be consistent with the original measurement, thereby thwarting any possibility of quantum interference. At this point, no other measurements are taken. And from the other qubits' point of view, no measurement has been made. Only the measured qubit and not its entangled counterpart, has interacted with the outside. Hence, only the one measured qubit is no longer coherent with the rest of the, as yet, unmeasured qubits. It is known that two observers can compare their information (i.e., their measurement outcome) only by physically interacting with each other. As long as there is no second measurement to compare with the first measurement, the unmeasured qubits remain uncollapsed. Consequently, they interfere as usual as if nothing had happened, provided however, that there are no further measurements taken of any of the two remaining GHZ qubits.

The measured qubit from each set forms the N-bit input to a conventional computer 901 which performs the inverse oracle function in the classical domain. If the output differs from the measured qubit within each set, that qubit is inverted by inverter 908 so that it is placed in the same state as the inverse oracle function output. This conditionally inverted measured qubit is provided as one of the two control inputs of a double-controlled phase-inversion gate 904. Note that any phase introduced from the classical domain inverse oracle function will not spoil the further interference, but will only multiply the final output by an unknown complex phase factor, which will not change the result.

From the "inside" the box point of view (i.e., from the qubits' perspective), it is the entire universe, excluding the "inside" the box qubits themselves, but including the classical domain inverse oracle function, that is in a superposition of states. This is the ultimate Schrodinger "Cat" state, since it includes almost the entire universe with the exception of the qubits "inside" the box. While it may seem at first blush that this should decohere almost immediate, it is well established that an upper bound on the decoherence time scale is set by the time scale on which a Schrodinger's Cat state is actually constructed. In the present case, this is on the order of ten billion years. (See J. R. Anglin, J. P. Paz, W. H. Zurek, "Deconstructing Decoherence," quant-ph/9611045).

The fourth, unentangled qubit, in a perfect superposition of $|0>$ and $|1>$ is provided to the other control input of the double-controlled phase-inversion gate 904. One of the two remaining, as yet unmeasured, GHZ qubits is provided to the third (conditionally inverted) input to the double-controlled phase-inversion gate 904. When the two control inputs are both $|1>$, the phase of the third input is inverted. For each of the N sets of four qubits, if the oracle input qubit was in the correct state, the corresponding double-controlled phase-inversion gate will not invert the phase, regardless of the state of the corresponding unentangled qubit. If the oracle input qubit was in the incorrect state, the phase will be inverted when the corresponding unentangled qubit is $|1>$ and not when it is $|0>$. If the originally unentangled qubit were to not be measured, then the sum of all possible values of this qubit must be taken.

For an N-bit oracle, since there are multiple quantum gates, the system should be analyzed as a whole. Re-ordering the 4.N qubits as four sets of N qubits, the input of the N-bit oracle can be represented in "ket" notation as $|e1; e2; e3; u>$, where $|e1>$, $|e2>$, and $|e3>$ are the three GHZ sets of N qubits, and $|u>$ is the fourth set of N unentangled qubits. The semicolons represent concatenation. Hence, the initial superposition of these four sets of N qubits is:

$$\left(\frac{1}{2}\right)^N * \sum_{e=0}^{N-1}\sum_{u=0}^{N-1} |e; e; e; u\rangle$$

Since the first three sets of N qubits are in a GHZ state:

$$|e1>=|e2>=|e3>=|e>$$

The $|e2>$ qubits are measured for the inputs of the inverse oracle function and conditionally inverted for use as the output of the inverse oracle function. The $|e3>$ qubits are then conditionally phase inverted if and only if the corresponding modified $|e2>$ and unentangled $|u>$ qubits are both $|1>$.

Given that the N bit correct answer for the one-hit oracle is defined to be $|c>$ then the $2(4* N)$ by unitary matrix representing the overall system, including the classical domain inverse oracle function is:

$$U(i, j) = c(|e2\rangle) \quad (i = j, |e2\rangle == |c\rangle, \text{ for } 2^N \text{ values of } |u\rangle)$$

$$c(|e2\rangle) \quad (i = j, |e2\rangle \mathrel{!=} |c\rangle, \text{parity }(|u\rangle) == |0\rangle)$$

$$-c(|e2\rangle) \quad (i = j, |e2\rangle \mathrel{!=} |c\rangle, \text{parity }(|u\rangle) == |1\rangle)$$

$$0 \quad (i = j),$$

Ignoring for the moment, that the $|e2>$ qubits have already been measured, if the operator U is now applied to the above superposition of $|e1; e2; e3; u>$ states and the $|e3>$ state is measured, while neglecting to measure the other qubits, the summation over all possible values of $|u>$ results in output qubits |e3>=|c> with probability 1. More precisely, these output qubits are multiplied by some unknown complex phase factor c(|e2>), but this does not change the result of the measurement.

But since there has, in fact, already been a measurement of the |e2> qubits, if the |e3> output qubits were now to be measured, then instead of getting the desired result, the answer would be what had originally been measured for the |e2> qubits. This is almost certainly not the correct result because from the "outside" universe's point of view, the state of the entangled qubits has already collapsed. Consequently, there is nothing left to interfere. But from the "inside" universe's point of view, these qubits are still in a superposition of states. As such, they are still free to interfere and hence, can produce the correct result. The "other branch" is still there but it cannot be measured from the "outside" universe for now without it being destroyed.

However, the currently preferred embodiment of the present invention overcomes this problem by measuring the quantum variables complementary to |e1>. One way to perform this measurement is to use a Pauli sigma-x or sigma-y operator 905 to rotate the qubits by 90 degrees and then using quantum measuring devices 906 to measure the z-axis. (See, for example, R. Laflamme, E. Knill, W. H. Zurek, P. Catasti, S. V .S. Mariappan, *NMR GHZ,* Quant-ph/9709025, Sep. 11, 1997 and N. Gershenfeld, I. Chaung, *Bulk Spin Resonance Quantum Computation,* Dec. 16, 1996, which are incorporated by reference in its entirety herein as background material). From the "outside" universe's point of view, there is complete knowledge of the state of the rotated |e1> qubits. However, there is no longer any knowledge of the state of the original |e1> qubits or of the originally entangled |e2> and|e3> qubits. Due to the fact that there is no longer any information about the state of the unrotated |e2> qubits, when the |e3> qubits are measured by quantum measuring devices 907, they can and will interfere, thereby producing the correct output |e3>=|c> with probability 1.

Figure 10:
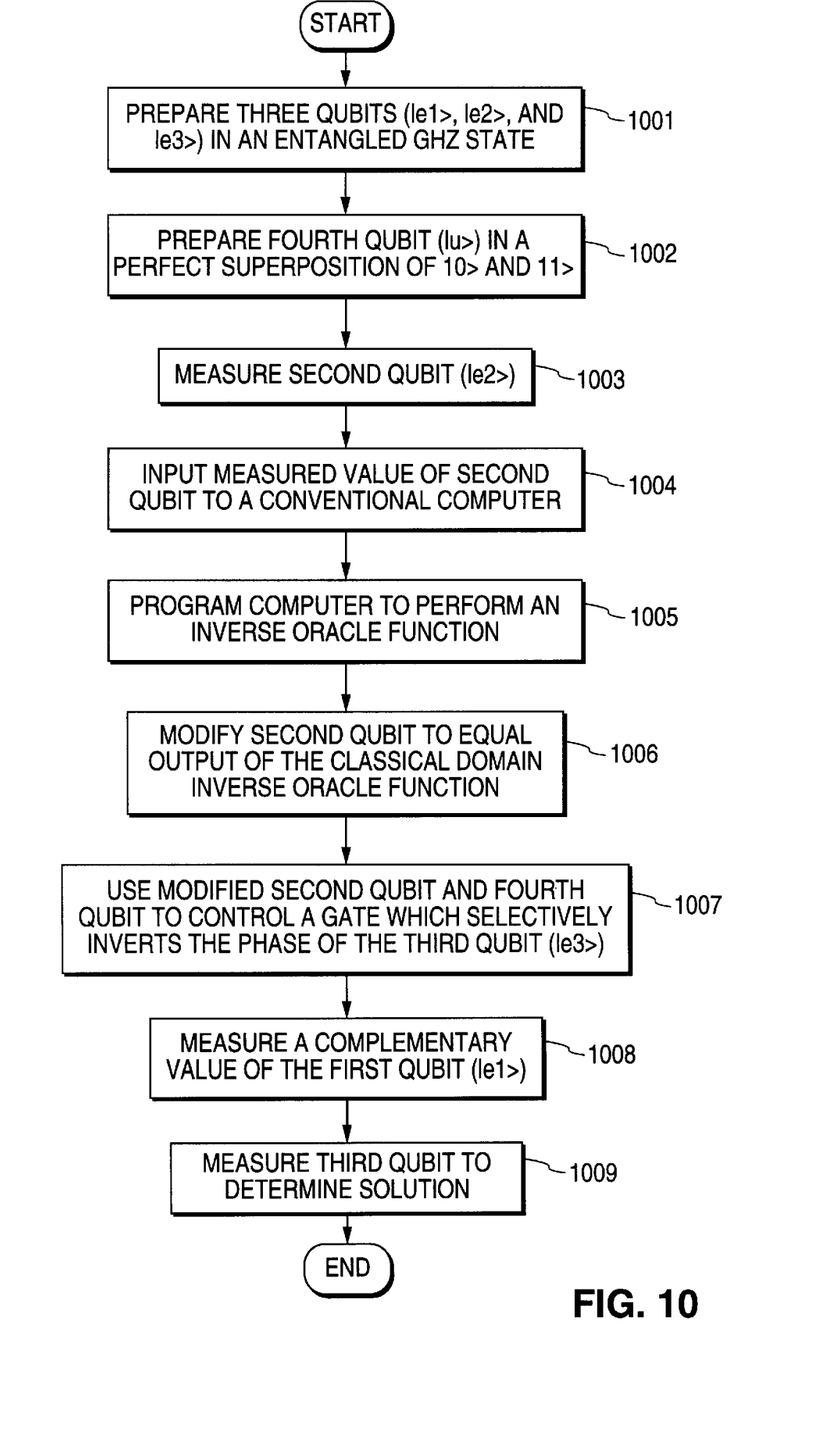
FIG. 10 is a flowchart describing the steps for performing the process of quantum acceleration of a conventional computer.

FIG. 10 is a flowchart describing the steps for performing the process of quantum acceleration of a conventional computer. The first step 1001 involves preparing three qubits (|e1>, |e2>, and |e3>) in an entangled GHZ state. A fourth qubit (|u>) is separately prepared in step 1002 which is in a perfect superposition of |0> and |1>. Afterwards, the second qubit (|e2>) is measured and input to a conventional computer, steps 1003 and 1004. The conventional computer is programmed to operate on the measured second qubit(s) to perform an inverse oracle function, step 1005. The second qubit is modified to equal the output of the classical domain inverse oracle function according to the conventional computer, step 1006. Next, the modified second qubit and unentangled fourth qubit interact with the third qubit (|e3>) in a double-controlled phase-inversion gate to selectively invert or not invert the phase of the third qubit, step 1007. A complementary variable to the first qubit (|e1>) is measured, step 1008. Lastly, third qubit is measured to find the final solution, step 1009. In one embodiment, this can be implemented by a 4-qubit chain interacting between neighbors, using bulk NMR over an ensemble of molecules with four interacting nuclei. (See E. Knill, I. Chuang, R. Laflamme, Effective Pure States for Bulk Quantum Computation; I. L. Chuang, L. M. K. Vandersypen, X. Zhou, D. W. Leung, S. Lloyd, *Experimental Realization of a Quantum Algorithm;* and J. A. Jones, M. Mosca, *Implementation of a Quantum Algorithm to Solve Deutsch's Problem on a Nuclear Magnetic Resonance Quantum Computer,* which are incorporated by reference in its entirety herein as background material).

Therefore, given a perfect one-hit oracle, the extension to NP-hard problems (e.g., 3SAT) is straightforward. It should also be pointed out that the classical domain inverse oracle function can have additional classical inputs. Consequently, given an arbitrary function evaluatable in polynomial time, one can evaluate its inverse also in polynomial time by designing or programming the inverse oracle function in the classical domain to output |o> if the additional, classical input equals the output of the function to be inverted, and |1> otherwise. Furthermore, it should be emphasized that the qubits involved in this process only interact amongst themselves within sets of four qubits, and then only three at a time. Thus, the perfect one-hit oracle is realized, even though the inverse oracle function is computed in the classical domain with a conventional computer.

The foregoing descriptions of specific embodiments of the present invention have been presented for purposes of illustration and description. Moreover, the lines shown in the Figures do not necessarily represent physical interconnections. Rather, they are used to show the relationships (e.g., timewise), interactions, and correspondences between the various devices (some of which are atomic in scale). As such, the described embodiments are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A process for performing quantum calculations using a conventional computer, comprising the steps of:

preparing at least a first qubit, a second qubit, a third qubit, and a fourth qubit by a quantum device;

measuring the second qubit to determine a measured second qubit;

inputting the measured second qubit into the conventional computer;

programming the conventional computer to perform an oracle function corresponding to the measured second qubit, wherein the oracle function determines whether the measured second qubit is correct or incorrect;

modifying the second qubit according to an output from the conventional computer to produce a modified qubit;

inputting the third qubit to a quantum gate;

controlling the quantum gate to selectively phase invert the third qubit in response to the modified second qubit and the fourth qubit;

measuring a complement of the first qubit;

measuring the third qubit to determine a final result.

2. The process of claim 1, wherein the first qubit, the second qubit, and the third qubit are maximally entangled and the fourth qubit is not entangled with the first qubit, the second qubit, and the third qubit.

3. The process of claim 2, wherein the first qubit, the second qubit, and the third qubit are in a Greenberger-Home-Zeilinger state.

4. The process of claim 3, wherein the fourth qubit is in a superposition of |0> and |1>.

5. The process of claim 1 further comprising the step of inverting the second qubit if the output from the conventional computer is different than the measured second qubit.

6. The process of claim 5, wherein the quantum gate is comprised of a double-controlled phase-inversion gate.

7. The process of claim 6 further comprising the step of inverting a phase corresponding to the third qubit if the modified second qubit and the fourth qubit are both in a |1> state.

8. A quantum accelerated computer system, comprising:
   a qubit quantum device for preparing at least a first qubit, a second qubit, a third qubit, and a fourth qubit;
   one or more quantum measurement devices coupled to the qubit quantum device for measuring the second qubit to determine a measured second qubit, measuring a complement to the first qubit, and measuring the third qubit;
   a computer comprised of semiconductor circuits coupled to the quantum measurement device(s) which performs an oracle function on the measured second qubit;
   a quantum circuit coupled to the computer that modifies the second qubit according to an output from the computer to produce a modified qubit;
   a quantum gate coupled to the quantum circuit which selectively phase inverts the third qubit in response to the modified qubit and the fourth qubit, wherein the measurement device(s) performs a measurement on a complement to the first qubit and performs a measurement on the third qubit to determine a solution.

9. The apparatus of claim 8, wherein the first qubit, the second qubit, and the third qubit are maximally entangled and the fourth qubit is not entangled with the first qubit, the second qubit, and the third qubit.

10. The apparatus of claim 9, wherein the first qubit, the second qubit, and the third qubit are in a Greenberger-Horne-Zeilinger state.

11. The apparatus of claim 10, wherein the fourth qubit is in a superposition of |0> and |1>.

12. The apparatus of claim 8 further comprising an inverter coupled to the computer which inverts the second qubit if the output from the conventional computer is different than the measured second qubit.

13. The apparatus of claim 12, wherein the quantum gate is comprised of a double-controlled phase-inversion gate.

14. The apparatus of claim 13, wherein the double-controlled phase-inversion gate inverts a phase corresponding to the third qubit if the modified qubit and the fourth qubit are both in a |1> state.

15. A computer system comprising:
   a quantum device for generating a plurality of qubits;
   a measurement device coupled to the quantum device for measuring one of the qubits which produces a regular bit;
   a semiconductor processor chip coupled to the measurement device for processing the regular bit and outputting a regular output bit, wherein the output bit is used to modify one of the qubits which is then measured to produce a result.

16. A hybrid quantum computer for performing quantum mechanical calculations comprising quantum devices coupled to a computer system having semiconductor circuits, wherein at least one qubit from one of the quantum devices is measured by the computer system and the computer system adjusts one of the qubits in response thereto.

17. A circuit, comprising:
   one or more qubit quantum devices for preparing a first set of one or more qubits, a second set of one or more qubits comprised of a maximally entangled copy of the first set of one or more qubits, and at least one unentangled qubit;
   an oracle circuit coupled to the quantum devices which performs a one-hit oracle function on the second set of qubits;
   at least one quantum gate coupled to the oracle circuit that modifies the first set of qubits according to an output from the oracle circuit and the unentangled qubit;
   a quantum measurement device coupled to the quantum gate for measuring an output of the quantum gate.

18. The circuit of claim 17, wherein the first set of qubits and the second set of qubits are in a maximally entangled state.

19. The circuit of claim 17, wherein the unentangled qubit is in a superposition of |0> and |1>.

20. The circuit of claim 17, wherein the quantum gate is comprised of a double-controlled phase-inversion gate.

21. The circuit of claim 20, wherein the double-controlled phase-inversion gate inverts a phase of one of the qubits of the first set if the output from the oracle circuit is the same as the unentangled bit.

22. The circuit of claim 17, wherein the oracle circuit is comprised of a plurality of quantum gates.

23. The circuit of claim 22, wherein the plurality of quantum gates are comprised of Fredkin-Toffoli gates.

24. The circuit of claim 17, wherein the oracle circuit is comprised of a computer having semiconductor chips.

25. The circuit of claim 17, wherein the oracle circuit performs an inverse oracle function which answers false when a correct input is supplied to the oracle circuit and answers true when an incorrect input is supplied to the oracle circuit.

26. The circuit of claim 25 further comprising a Pauli negation matrix coupled to the output of the oracle circuit.

* * * * *